(12) United States Patent
Winger

(10) Patent No.: US 8,233,547 B2
(45) Date of Patent: *Jul. 31, 2012

(54) METHOD FOR ACTIVATION AND DEACTIVATION OF INFREQUENTLY CHANGING SEQUENCE AND PICTURE PARAMETER SETS

(75) Inventor: Lowell L. Winger, Waterloo (CA)

(73) Assignee: LSI Corporation, Milpitas, CA (US)

( * ) Notice: Subject to any disclaimer, the term of this patent is extended or adjusted under 35 U.S.C. 154(b) by 968 days.

This patent is subject to a terminal disclaimer.

(21) Appl. No.: 12/190,629

(22) Filed: Aug. 13, 2008

(65) Prior Publication Data

US 2008/0310500 A1 Dec. 18, 2008

Related U.S. Application Data

(63) Continuation of application No. 10/731,591, filed on Dec. 9, 2003, now Pat. No. 7,415,069.

(51) Int. Cl.
*H04N 7/12* (2006.01)

(52) U.S. Cl. ............................. 375/240.25; 375/240.01

(58) Field of Classification Search .................. 375/240, 375/240.01, 240.12, 240.25
See application file for complete search history.

(56) References Cited

U.S. PATENT DOCUMENTS

| | | | |
|---|---|---|---|
| 6,011,868 A | 1/2000 | van den Braden et al. ... | 382/233 |
| 6,236,960 B1 | 5/2001 | Peng et al. .................... | 704/211 |
| 6,999,512 B2 | 2/2006 | Yoo et al. .................. | 375/240.03 |
| 7,227,901 B2 | 6/2007 | Joch et al. ................ | 375/240.29 |

*Primary Examiner* — Allen Wong
(74) *Attorney, Agent, or Firm* — Christopher P. Maiorana, PC

(57) ABSTRACT

A method for activating and deactivating parameter sets during decoding of a bitstream for display, comprising the steps of: (A) tagging a first picture parameter information set associated with a first identification value as active in response to a reference to the first identification value in a bitstream; (B) changing the tag of the first picture parameter information set from active to inactive and tagging a second picture parameter information set associated with a second identification value as active in response to a reference to the second identification value in the bitstream; and (C) tagging the second picture parameter information set as inactive and re-tagging the first picture parameter information set as active in response to a subsequent reference to the first identification value in the bitstream.

20 Claims, 3 Drawing Sheets

METHOD FOR ACTIVATION AND DEACTIVATION OF INFREQUENTLY CHANGING SEQUENCE AND PICTURE PARAMETER SETS

This is a continuation of U.S. Ser. No. 10/731,591, filed Dec. 9, 2003, now U.S. Pat. No. 7,415,069, which is incorporated by reference.

FIELD OF THE INVENTION

The present invention relates to video generally and, more particularly, to a method for activation and deactivation of infrequently changing sequence and picture parameter sets.

BACKGROUND OF THE INVENTION

In the MPEG-2 and MPEG-1 compression standards, infrequently changing picture parameter information is transmitted as a picture header included with every coded picture. The H.264/MPEG4-AVC standard divides infrequently changing picture parameter information into sequence parameter sets (SPSs) and picture parameter sets (PPSs) that may be transmitted only infrequently. Examples of infrequently changing picture parameter information include picture dimensions (i.e., picture width and height in pixels), initial picture quantization parameters (QPs) and various other coding parameters that are specified at a picture level.

The existing solution only activates picture parameter sets when the picture parameter sets are first referenced and does not provide a process for deactivating the activated picture parameter sets. The existing solution has a number of interrelated disadvantages. The existing solution prevents re-assignment of a "the active parameter set" tag to a previously encountered parameter set unless the previously encountered parameter set is re-transmitted with a new id such that a new first reference can occur. A practical scenario that illustrates the disadvantage of restricting activation of parameter sets to the first reference is the scenario of commercial insertion. Because the re-assignment of the "the active parameter set" tag to a parameter set previously tagged as "the active parameter set" is not possible, the parameter sets for a main program must be re-transmitted with a new id when returning to the main program after each commercial insertion. Because only a finite number of ids are available, a bitstream may eventually run out of unique ids that can be used to activate a parameter set through a "first" reference (i.e., after a finite number of parameter changes no more changes to the parameters would be possible in the existing solution).

Another disadvantage of the existing solution is that the lack of a process for deactivating parameter sets allows an activated sequence parameter set to remain active for an entire coded video sequence and imposes no restriction on activation of new sequence parameter sets. As a result, a new sequence parameter set can be activated and be tagged as "the active parameter set" in the middle of the coded video sequence. A coded video sequence is defined as a sequence of pictures, in decoding order, beginning with an instantaneous decoding refresh (IDR) picture and followed by zero or more non-IDR pictures. An IDR picture prevents motion compensated prediction from previous (in decoding order) pictures. Because a new sequence parameter set can be tagged as "the active parameter set" in the middle of the coded video sequence, pictures with different resolution and dimensions can be motion compensated from each other. Permitting a new sequence parameter set to be tagged as "the active parameter set" in the middle of the coded video sequence could greatly complicate the implementation of decoders compliant with the standard.

A solution that provides for activation and deactivation of infrequently changing sequence and picture parameter sets would be desirable.

SUMMARY OF THE INVENTION

The present invention concerns a method for activating and deactivating parameter sets during decoding of a bitstream for display, comprising the steps of: (A) tagging a first picture parameter information set associated with a first identification value as active in response to a reference to the first identification value in a bitstream; (B) changing the tag of the first picture parameter information set from active to inactive and tagging a second picture parameter information set associated with a second identification value as active in response to a reference to the second identification value in the bitstream; and (C) tagging the second picture parameter information set as inactive and re-tagging the first picture parameter information set as active in response to a subsequent reference to the first identification value in the bitstream.

The objects, features and advantages of the present invention include providing a method for activation and deactivation of infrequently changing sequence and picture parameter sets that may (i) allow parameter sets that have been previously deactivated to be reactivated by reference to the set, (ii) no longer activate a new sequence parameter set in the middle of a coded video sequence, (iii) reduce overhead in bitstreams for transmission of parameter sets and/or (iv) reduce the complexity of compliant decoders.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

The present invention generally activates a parameter set (e.g., a sequence parameter set (SPS) and/or a picture parameter sets (PPS)) whenever a reference (e.g., an id value associated with the parameter set) is made to the parameter set (e.g., not only when FIRST referred to). The present invention further provides for deactivation of parameter sets. For example, the active picture parameter set is generally deactivated whenever a new picture parameter set is activated and tagged as "the active" picture parameter set. Similarly, the active sequence parameter set may be de-activated whenever a new sequence parameter set is activated and tagged as "the active" sequence parameter set. In general, the present invention tightly couples the activation and deactivation of parameter sets and the labelling (or tagging) of parameter sets as "the active" parameter sets.

Figure 1:
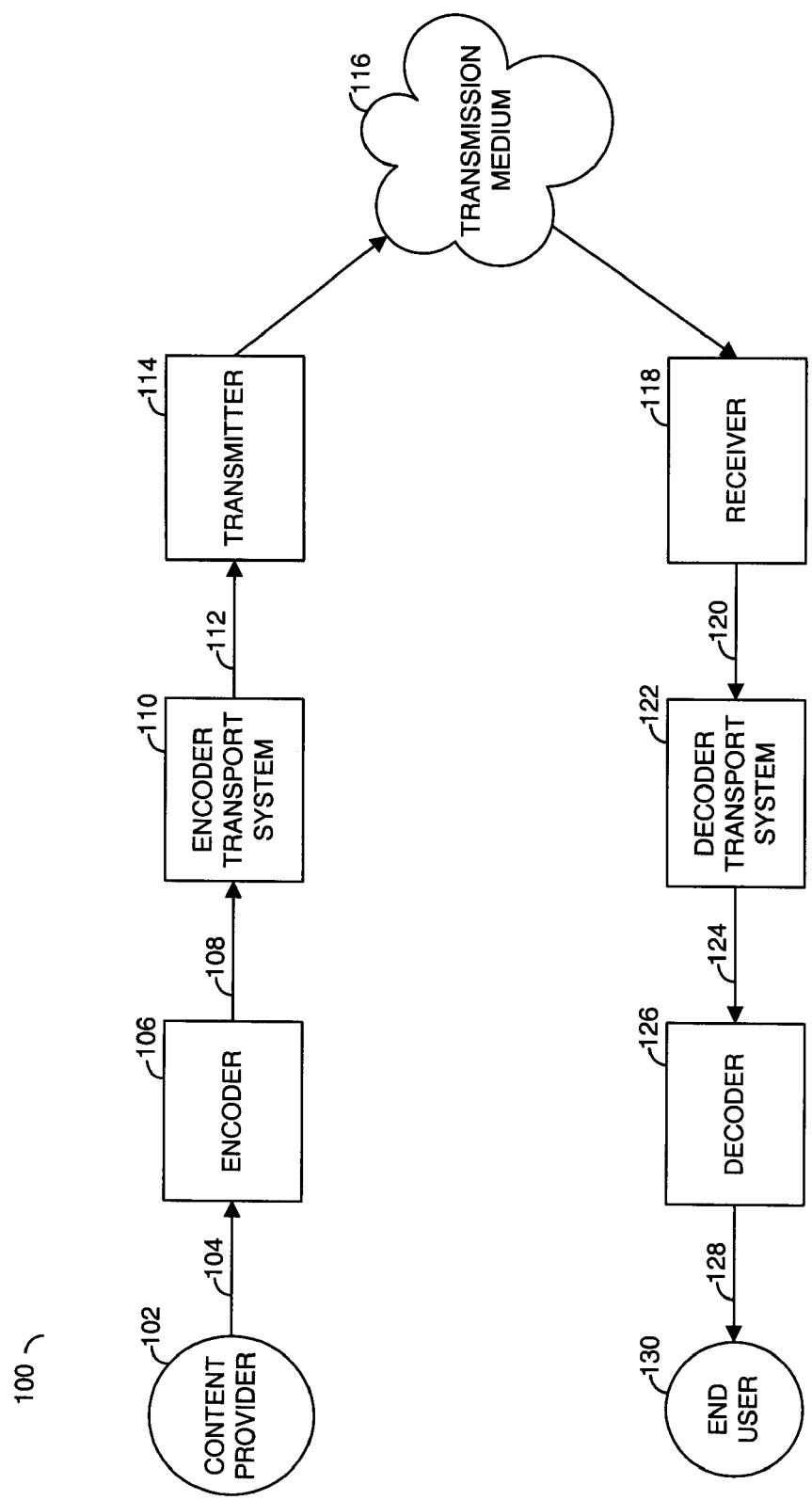
FIG. 1 is a block diagram of a video system in accordance with a preferred embodiment of the present invention.

Referring to FIG. 1, a block diagram of a system 100 is shown. In general, a content provider 102 presents video image, audio or other data 104 to be compressed and transmitted to an input of an encoder 106. The encoder 106 may be implemented, in one example, as an H.264/MPEG4-AVC compliant encoder. Compressed data 108 from the encoder 106 may be presented to an encoder transport system 110. An output of the encoder transport system 110 generally presents a signal 112 to a transmitter 114. The transmitter 114 transmits the compressed data via a transmission medium 116. The content provider 102 may comprise a video broadcast, DVD, or any other source of video data stream. The transmission medium 116 may comprise a broadcast, cable, satellite, network, DVD, hard drive, or any other medium implemented to carry, transfer, and/or store a compressed bitstream.

On a receiving side of the system 100, a receiver 118 generally receives the compressed data bitstream from the transmission medium 116. The receiver 118 presents a bitstream 120 to a decoder transport system 122. The decoder transport system 122 generally presents the bitstream via a link 124 to a decoder 126. The decoder 126 may be implemented, in one example, as an H.264/MPEG4-AVC compliant decoder. The decoder 126 generally decompresses the data bitstream and presents the data via a link 128 to an end user 130. The end user 130 may comprise a television, monitor, computer, projector, hard drive, or any other medium and/or device implemented to carry, transfer, present, display and/or store an uncompressed bitstream.

Figure 2:
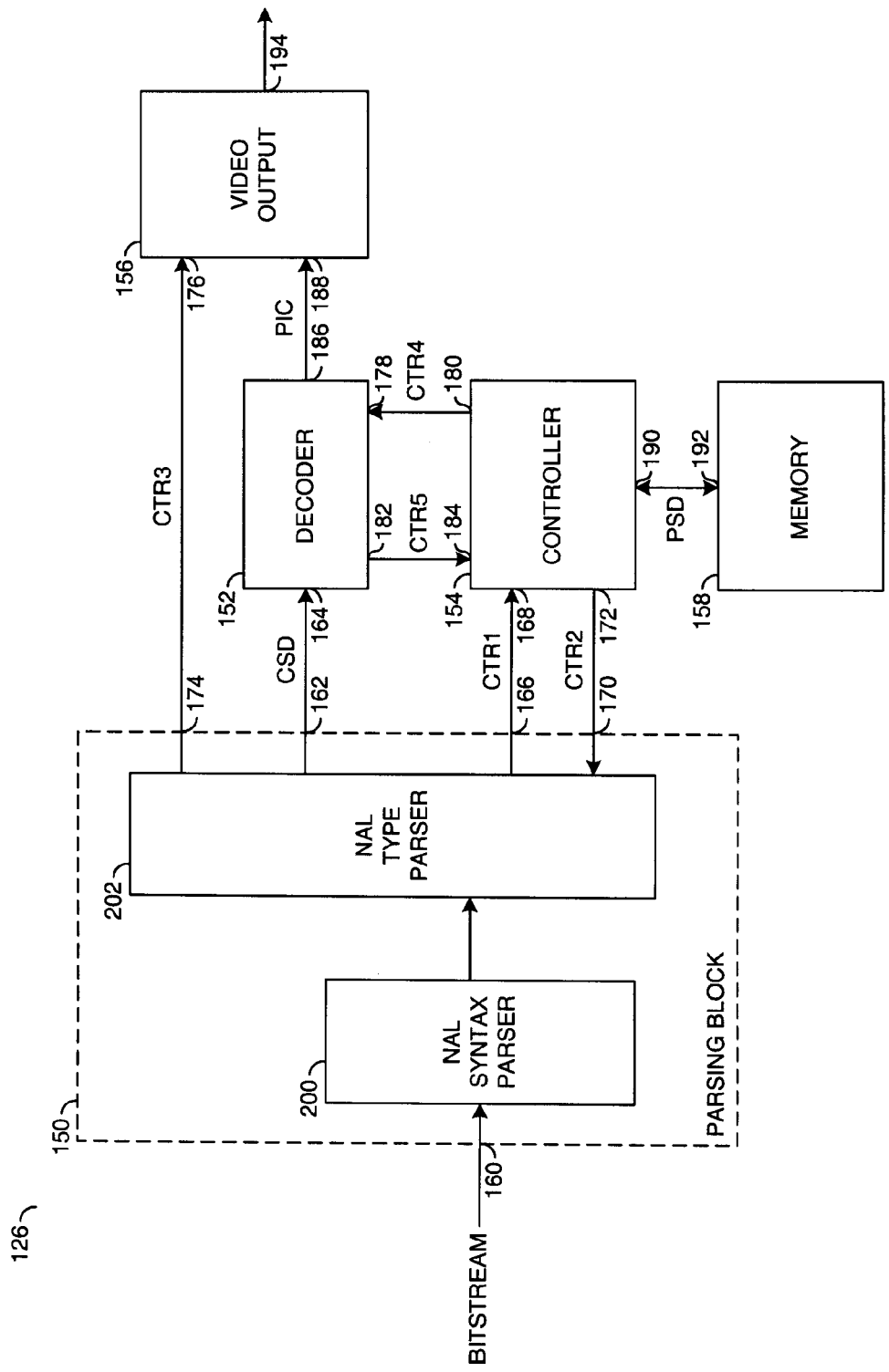
FIG. 2 is a more detailed block diagram of a decoder of FIG. 1.

Referring to FIG. 2, a more detailed block diagram of the decoder 126 of FIG. 1 is shown. The decoder 126 may comprise a block 150, a block 152, a block 154, a block 156 and a block 158. The block 150 may be implemented, in one example, as a parsing block. The block 152 may be implemented, in one example, as a decoder block. The block 154 may be implemented, in one example, as a controller block. The block 156 may be implemented, in one example, as a video output block. The block 158 may be implemented, in one example, as a memory block.

A bitstream (e.g., BITSTREAM) may be presented to an input 160 of the block 150. The bitstream BITSTREAM may comprise, in one example, an H.264/MPEG4-AVC compliant bitstream. In general, the bitstream presented to the decoder 126 may be in one of two formats: a network abstraction layer (NAL) unit stream format or a byte stream format. The byte stream format may be constructed from the NAL unit stream format by ordering the NAL units in decoding order and prefixing each NAL unit with a start code prefix and zero or more zero valued bytes to form a stream of bytes. The NAL unit stream format is conceptually the more basic type. The NAL unit stream format generally comprises a sequence of syntax structures referred to as NAL units. The sequence of the NAL units is generally arranged in decoding order.

In general, constraints may be imposed on the decoding order (and contents) of the NAL units in the NAL unit stream. For example, a NAL unit containing a picture or sequence parameter set that is activated through reference by a coded slice NAL unit or coded slice data partition NAL unit must occur in the NAL unit stream prior to the NAL unit that activates the picture or sequence parameter set. Also, any picture parameter set NAL unit containing the same identification value as the active picture parameter set must have the same content as the active set, unless the picture parameter set NAL unit follows the last video coding layer NAL unit of a coded picture and precedes the first video coding layer NAL unit of another coded picture. Practically speaking, the contents of an active picture parameter set may not change in between the slices of a single picture. Similarly, the contents of an active sequence parameter set may not be modified within a single coded video sequence. The term "coded video sequence" as used herein generally refers to a series of coded pictures associated with a single buffering period supplemental enhancement information (SEI) message that (i) begins with an IDR NAL unit and (ii) contains only one IDR picture/access unit.

The NAL unit stream format may be extracted from the byte stream format by searching for the location of a unique start code prefix pattern within the stream of bytes. However, other methods of framing the NAL units may be implemented accordingly to meet the design criteria of a particular application. The start code prefix generally comprises a unique sequence of three bytes (e.g., equal to 0x000001) embedded in the byte stream as a prefix to each NAL unit. The location of a start code prefix may be used by the decoder 126 to identify the beginning of a new NAL unit and the end of a previous NAL unit. Emulation of start code prefixes is generally prevented within NAL units by the inclusion of emulation prevention bytes. An emulation prevention byte as used herein generally refers to a byte equal to 0x03, for example, that may be present within an NAL unit. The presence of emulation prevention bytes generally ensures that no sequence of consecutive byte align bytes in the NAL unit contain a start code prefix. An NAL unit as used herein generally refers to a syntax structure containing an indication of the type of data to follow and bytes containing the data in the form of a raw byte sequence payload (RBSP) interspersed as necessary with emulation prevention bytes. A RBSP as used herein refers to a syntax structure containing an integer number of bytes that is encapsulated in a NAL unit. A RBSP may be either empty or have the form of a string of data bytes containing syntax elements followed by an RBSP stop bit. The RBSP stop bit may be followed by zero or more subsequent bits equal to zero.

The block 150 may have an output 162 that may present one or more signals (e.g., CSD) to an input 164 of the block 152, an output 166 that may present one or more signals (e.g., CTR1) to an input 168 of the block 154, an input 170 that may receive one or more signals (e.g., CTR2) from an output 172 of the block 154 and an output 174 that may present one or more signals (e.g., CTR3) to an input 176 of the block 156. The block 152 may have an input 178 that may receive one or more signals (e.g., CTR4) from an output 180 of the block 154, an output 182 that may present one or more signals (e.g., CTR5) to an input 184 of the block 154 and an output 186 that may present one or more signals (e.g., PIC) to an input 188 of the block 156. The block 154 may have an input/output 190 that generally communicates (e.g., via a signal PSD) with an input/output 192 of the block 158. The block 156 may have an output 194 that generally presents, in one example, a decoded bitstream.

The signal CSD may comprise coded slice data parsed from the bitstream BITSTREAM. The signals CTR1, CTR2, CTR3, CTR4, and CTR5 may comprise, in one example, control signals and/or control information. The signal CTR1 may comprise (i) sequence and picture parameter set information and (ii) sequence and picture delimiters (e.g., access unit delimiter, end-of-sequence, end-of-stream, etc.). The signal CTR2 may comprise information for controlling parsing operations based on the active SPS and/or PPS. The signal CTR3 may comprise parsed SEI messages and user data. The signal CTR4 may comprise information regarding the active picture and sequence parameter sets. The information may be sent to the decoder at or before decoding of the picture or sequence, respectively. The signal CTR5 may comprise, for example, information concerning which particular parameter set (e.g., an identification value) the current video coding layer slice references.

The block 150 may comprise a block 200 and a block 202. The block 200 may be implemented, in one example, as an NAL unit syntax parser. The block 202 may be implemented, in one example, as an NAL unit type parser. The block 200 may be configured to parse the NAL unit syntax from the bitstream BITSTREAM and present the parsed NAL unit syntax to the NAL unit type parser 202. The NAL unit type parser 202 may be configured to parse an NAL unit according to the particular NAL type of the NAL unit. The NAL unit type parser 202 may comprise, in one example, a number of parser blocks, each of which may be configured to parse one or more particular NAL unit types. In one example, the block 202 may comprise a separate parser for NAL type 1, NAL type 5, NAL type 7, NAL type 8, NAL types 9-12 and NAL type 6. The block 202 may further comprise a parser block configured to parse NAL types 2, 3 and 4.

The block 154 may be configured to control the activation and deactivation of picture parameter sets and sequence parameter sets. The picture parameter sets and sequence parameter sets may be received by the controller 154 from the block 152 via the signal CTR1. The block 154 may be configured to store the picture parameter sets and sequence parameter sets in the memory 158. In one example, the controller 154 may be configured to store up to 32 sequence parameter sets and up to 256 picture parameter sets. However, other numbers of PPSs and SPSs may be stored accordingly to meet the design criteria of a particular application.

In general, the controller 154 may be configured to activate a particular SPS (e.g., label or tag the SPS as active) in response to a reference (e.g., an identification value) contained within one or more of the NAL units in the bitstream BITSTREAM (e.g., in NAL types 1, 5, 8-12 or 6). However, references in other types of NAL units (e.g., 2, 3 and 4) may also be implemented to activate and deactivate SPSs. The controller 154 may be configured to control the decoding process (e.g., via the signal CTR4) and parsing of coded slices of picture data and supplemental enhancement information (SEI) messages based on the particular SPS that is activated (e.g., via the signal CTR2). Supplemental enhancement information (SEI) contains information that is not necessary to decode the samples of coded pictures from video coding layer (VCL) NAL units. An SEI NAL unit generally contains one or more SEI messages. Each SEI message may consist of variables specifying the payload type and payload size of the SEI payload.

The controller 154 may be further configured to activate a particular PPS in response to a reference (e.g., an identification value received via the signal CTR5) to the particular PPS in one or more types of NAL units (e.g., NAL types 1 and 5). However, references by other types of NAL units (e.g., 2, 3 and 4) may be implemented accordingly to meet the design criteria of a particular application. The controller 154 may be configured to control the decoding process of picture slices (e.g., for NAL unit types 1 and 5) and the parsing of coded slices of picture data and SEI messages based on the activated PPS. In general, the present invention activates and deactivates SPSs and PPSs as well as determines the contents of the SPSs and PPSs in response to references contained in the encoded bitstream. The present invention generally controls the parsing of some of the NAL types and the operation of the decoder circuit (or processes) 152 based on the activated SPS and PPS. The controller 154 may be further configured to control changes to or modification of the activated SPS and PPS. For example, the controller 154 may prevent the active SPS and/or PPS from being changed during a coded video sequence.

Figure 3:
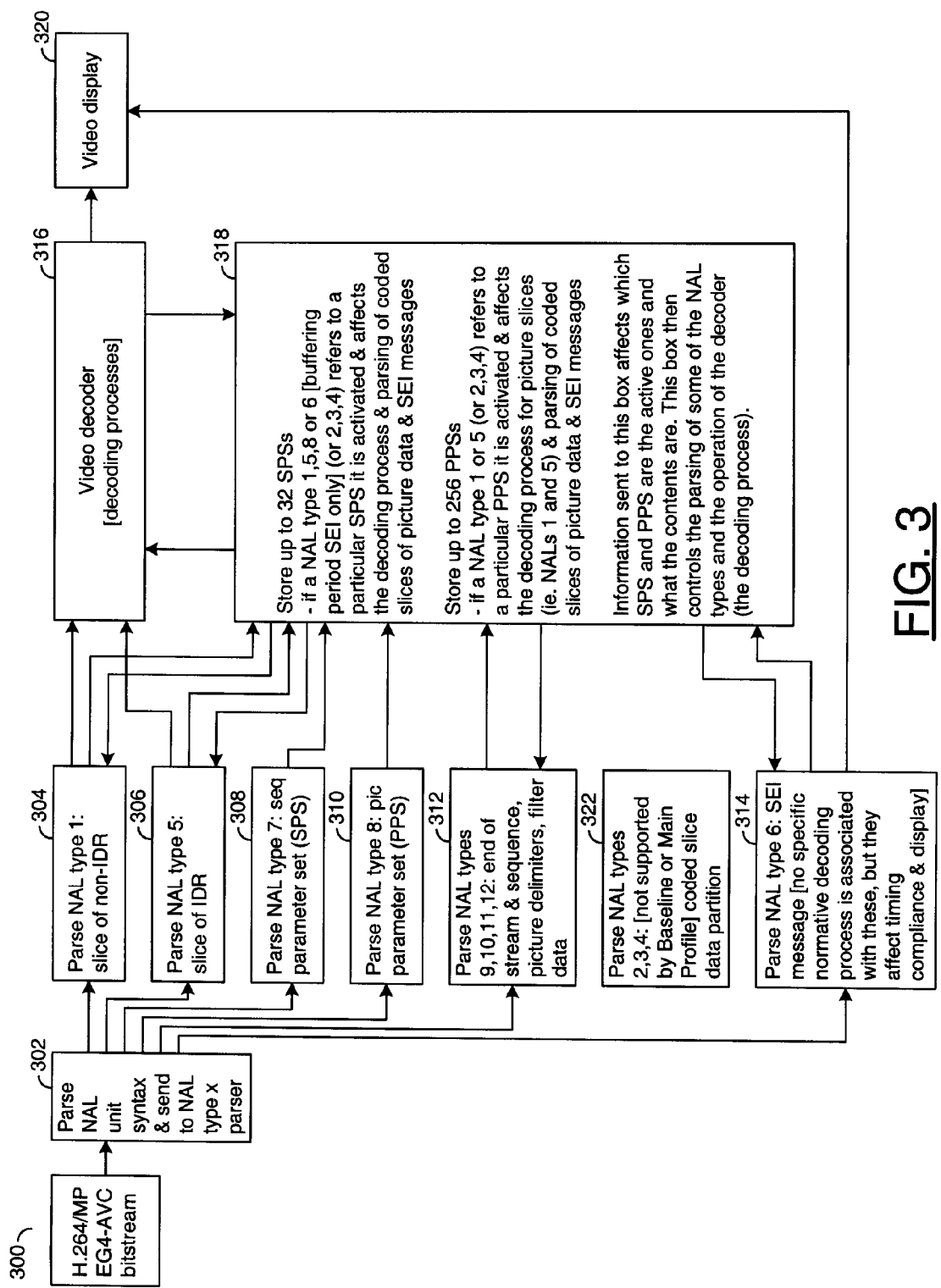
FIG. 3 is a flow diagram of a process in accordance with a preferred embodiment of the present invention.

Referring to FIG. 3, a flow diagram 300 is shown illustrating a process for activation and deactivation of infrequently changing sequence and picture parameter sets in accordance with a preferred embodiment of the present invention. The process 300 may be implemented as part of a general decoding process for encoded bitstreams. The process 300 may comprise a number of states 302-322. In the state 302, the process 300 may receive and parse a H.264/MPEG4-AVC compliant bitstream. For example, the bitstream may be parsed to determine the syntax of one or more NAL units. Based on an NAL type of the NAL unit, the process 300 may move to one of the states 304-314. For example, when the NAL type is 1, the process 300 generally moves to the state 304. When the NAL type is 5, the process 300 generally moves to the state 306. When the NAL type is 7, the process 300 generally moves to the state 308. When the NAL type is 8, the process 300 generally moves to the state 310. When the NAL type is one of the types 9-12, the process 300 generally moves to the state 312. When the NAL type is 6, the process 300 generally moves to the state 314.

In the state 304, the process 300 generally parses coded slices of non-IDR picture data according to the activated SPS and PPS. The parsed slices of non-IDR picture data are generally passed on to decoding processes (e.g., in the block 316). In the state 306, the process 300 generally parses coded slices of IDR picture data according to the particular activated SPS and PPS. The parsed slices of IDR picture data are generally passed to the decoding processes (e.g., the block 316). In the state 308, the process 300 generally loads (receives, accepts, etc.) a new sequence parameter set from the bitstream. The new sequence parameter set is generally passed to a control process (or block) 318. In the state 310, the process 300 generally loads (receives, accepts, etc.) a new picture parameter set from the bitstream. The new picture parameter set is generally passed to the control processes (or block) 318. In the state 312, the process 300 generally extracts (identifies, etc.) (i) end of stream and sequence picture delimiters and (ii) filter data. The end of stream and sequence picture delimiters and filter data are generally passed to the control processes (or block) 318. In the state 314, the process 300 generally parses SEI messages based on the particular active SPS and PPS. In the state 314, the process 300 may also receive information regarding activation and/or deactivation of sequence and picture parameter sets. The information concerning activation and/or deactivation is generally passed to the control processes 318.

In the state 318, the process 300 generally (i) stores newly received sequence parameter sets and picture parameter sets, (ii) affects the decoding processes (e.g., the block 316) and (iii) affects the parsing of coded slices of picture data and SEI messages (e.g., the states 304-314). In the state 316, the process 300 generally decodes the parsed coded slices of picture data received from the states 304 and 306 according to the particular activated SPS and PPS indicated by the control processes 318. In the state 320, the process 300 generally displays a decoded video picture. The display of the decoded picture may be affected by information received via one or more SEI messages parsed in the state 314.

The present invention generally provides a simplified decoder implementation in comparison to existing solutions. The present invention tightly couples the activation of parameter sets with tagging an active parameter set as "the active picture parameter set" or "the active sequence parameter set". In general, only one sequence parameter set (SPS) and one picture parameter set (PPS) may be active and labelled as "the active sequence parameter set" and "the active picture parameter set," respectively, at any given time. For example, a decoder implemented in accordance with the present invention may only consider the value of "the active" SPS and "the active" PPS in the process of determining activation of parameter sets.

The present invention generally provides for specifying syntax and associated semantics for infrequently changing picture parameter information in, for example, a H.264/MPEG4-AVC compliant bitstreams and an associated decoding process for the syntax, respectively. The present invention may provide a solution that defines an order of sequence and picture parameter set RBSPs and/or a process for activation and deactivation of the sequence and picture parameter set RBSPs. The sequence and picture parameter set mechanism in accordance with the present invention generally decouples the transmission of infrequently changing information from the transmission of coded macroblock data. For example, sequence and picture parameter sets may, in some applications, be conveyed "out-of-band" using a reliable transport mechanism. As used herein, out-of-band generally refers to transmission via a separate channel or medium from the channel or medium carrying data. Conversely, in-band generally refers to transmission via the same channel or medium (e.g., embedded, etc.).

A picture parameter set raw byte sequence payload (PPS_RBSP) generally includes parameters that may be referred to by coded slice network abstraction layer (NAL) units or coded slice data partition NAL units of one or more coded pictures. When a picture parameter set RBSP (e.g., having a particular associated identification value) is referred to by a coded slice NAL unit or a coded slice data partition NAL unit (e.g., using the corresponding identification value), the picture parameter set is activated (e.g., a tag or flag associated with the PPS_RBSP may be set to a value indicating that the PPS_RBSP is activated). The activated picture parameter set RBSP is referred to (or labeled) as the active picture parameter set RBSP until deactivated by the activation of another picture parameter set RBSP. A picture parameter set RBSP is generally made available to the decoding process prior to activation as "the active PPS_RBSP." Any picture parameter set NAL unit containing the corresponding identification value for the active picture parameter set RBSP is presumed to have the same content as that of the active picture parameter set RBSP unless the picture parameter set NAL unit follows the last video coding layer (VCL) NAL unit of a coded picture and precedes the first VCL NAL unit of another coded picture.

A sequence parameter set raw byte sequence payload (SPS_RBSP) generally includes parameters that may be referred to by one or more picture parameter set RBSPs or one or more supplemental enhancement information (SEI) NAL units containing a buffering period SEI message. When a sequence parameter set RBSP (with a particular identification value) is first referred to by activation of a picture parameter set RBSP (e.g., using the particular identification value) or is first referred to by an SEI NAL unit containing a buffering period SEI message (e.g., using the particular identification value), the sequence parameter set RBSP is activated. The sequence parameter set RBSP is generally referred to as "the active sequence parameter set RBSP" until deactivated by the activation of another sequence parameter set RBSP. A sequence parameter set RBSP, with the particular identification value, is generally available to the decoding process prior to activation. An activated sequence parameter set RBSP generally remains active for the entire coded video sequence. Any sequence parameter set NAL unit containing the identification value for (or other reference associated with) the active sequence parameter set RBSP is generally presumed to have the same content as the active sequence parameter set RBSP unless the sequence parameter set NAL follows the last access unit of a coded video sequence and precedes the first VCL NAL unit and the first SEI NAL unit containing a buffering period SEI message (when present) of another coded video sequence.

When a picture parameter set RBSP or a sequence parameter set RBSP is conveyed within the bitstream, an order constraint is generally imposed on the NAL units that contain the picture parameter set RBSP or sequence parameter set RBSP, respectively. Otherwise the PPS_RBSP and SPS_RBSP are generally available to the decoding process in a timely fashion such that the constraints are met (e.g., the picture parameter set RBSP or the sequence parameter set RBSP may be conveyed by other means not specified in a particular standard or recommendation (e.g., the H.264/MPEG4-AVC standard, etc.).

During operation of the decoding process, the values of parameters of the active picture parameter set and the active sequence parameter set are generally considered in effect. For interpretation of SEI messages, the values of the parameters of the picture parameter set and sequence parameter set that are active for the operation of the decoding process for the VCL NAL units of the primary coded picture in the same access unit are considered in effect unless otherwise specified in the SEI message semantics.

The present invention generally allows parameter sets that have been previously activated to be re-activated by subsequent reference to the parameter sets. The parameter sets may be re-activated without being resent or having a new identification value assigned. For a bitstream to be considered valid by a decoder implemented in accordance with the present invention, the bitstream may no longer activate a new sequence parameter set in the middle of a coded video sequence (e.g., between successive IDR pictures).

The present invention may have an advantage of reduced overhead in a bitstream for transmission of parameter sets. In one example, the overhead may be reduced where frequent commercial insertions occur in a program. In another example, reduced overhead may be realized during a compressed domain video editing process with frequent switches back and forth between various shots or different source material. The present invention may allow reduced complexity implementations of compliant decoders with the restriction that only one SPS may be active for each coded video sequence. The present invention may provide a standard process for ordering and activating sequence and picture parameter set RBSPs.

The operations described in the flow diagram of FIG. 3 may be implemented using a conventional general purpose digital computer programmed according to the teachings of the present specification, as will be apparent to those skilled in the relevant art(s). Appropriate software coding can readily be prepared by skilled programmers based on the teachings of the present disclosure, as will also be apparent to those skilled in the relevant art(s).

The present invention may also be implemented by the preparation of ASICs, FPGAs, or by interconnecting an appropriate network of conventional component circuits, as is described herein, modifications of which will be readily apparent to those skilled in the art(s).

The present invention thus may also include a computer product which may be a storage medium including instructions which can be used to program a computer to perform a process in accordance with the present invention. The storage medium can include, but is not limited to, any type of disk including floppy disk, optical disk, CD-ROM, and magneto-optical disks, ROMs, RAMs, EPROMs, EEPROMs, Flash memory, magnetic or optical cards, or any type of media suitable for storing electronic instructions.

While the invention has been particularly shown and described with reference to the preferred embodiments thereof, it will be understood by those skilled in the art that various changes in form and details may be made without departing from the spirit and scope of the invention. For example, the present invention may also be applicable to the forthcoming professional profile extensions of the H.264/MPEG4-AVC standard, and in other future video coding standards.

The invention claimed is:

1. A method for activating and deactivating parameter sets during decoding of a bitstream for display, comprising the steps of:
    (A) tagging a first picture parameter information set associated with a first identification value as active by a decoder in response to a reference to said first identification value in a bitstream;
    (B) changing the tag of said first picture parameter information set from active to inactive and tagging a second picture parameter information set associated with a second identification value as active by said decoder in response to a reference to said second identification value in said bitstream; and
    (C) tagging said second picture parameter information set as inactive and re-tagging said first picture parameter information set as active by said decoder in response to a subsequent reference to said first identification value in said bitstream.

2. The method according to claim 1, wherein said first picture parameter information set and said second picture parameter information set comprise H.264/MPEG4-AVC compliant picture parameter sets.

3. The method according to claim 1, wherein said first picture parameter information set and said second picture parameter information set comprise H.264/MPEG4-AVC compliant sequence parameter sets.

4. The method according to claim 1, wherein:
    said first picture parameter information set and said second picture parameter information set are received in said bitstream prior to receiving said reference to said first identification value and said reference to said second identification value, respectively.

5. The method according to claim 1, further comprising the step of:
    storing said first picture parameter information set and said second picture parameter information set in a computer readable storage medium, wherein said first and said second picture parameter information sets comprise infrequently changing picture parameter information.

6. The method according to claim 5, wherein the step of storing picture parameter information sets further comprises storing a plurality of sequence parameter sets and a plurality of picture parameter sets and only one sequence parameter set and one picture parameter set are tagged as active at any given time.

7. The method according to claim 1, further comprising the steps of:
    parsing network abstraction layer (NAL) unit syntax from said bitstream; and
    parsing one or more NAL unit types from said NAL unit syntax.

8. The method according to claim 7, further comprising the step of:
    controlling said parsing of said one or more NAL unit types based upon an active sequence parameter set and an active picture parameter set.

9. The method according to claim 1, further comprising the step of:
    controlling a video decoding process based upon an active sequence parameter set and an active picture parameter set.

10. An apparatus comprising:
    means for tagging a first picture parameter information set associated with a first identification value as active in response to a reference to said first identification value in a bitstream;
    means for changing a tag of said first picture parameter information set from active to inactive and tagging a second picture parameter information set associated with a second identification value as active in response to a reference to said second identification value in said bitstream;
    means for re-tagging said first picture parameter information set as active and tagging said second picture parameter information set as inactive in response to a subsequent reference to said first identification value in said bitstream, wherein said bitstream is decoded for display based upon the active picture parameter information set and said first and said second picture parameter information sets are received in said bitstream prior to receiving said reference to said first identification value and said reference to said second identification value, respectively.

11. An apparatus comprising:
    a first circuit configured to receive a bitstream including a first picture parameter information set associated with a first identification value and a second picture parameter information set associated with a second identification value, wherein said first picture parameter information set and said second picture parameter information set are received in said bitstream prior to receiving a reference to said first identification value and a reference to said second identification value, respectively; and
    a second circuit configured (i) to tag said first picture parameter information set as active in response to receiving said reference to said first identification value in said bitstream, (ii) to change the tag of said first picture parameter information set from active to inactive and tag the second picture parameter information set as active in response to receiving said reference to said second identification value in said bitstream and (iii) to re-tag said first picture parameter information set as active and tag said second picture parameter information set as inactive in response to receiving a subsequent reference to said first identification value in said bitstream.

12. The apparatus according to claim 11, wherein said first picture parameter information set and said second picture parameter information set comprise H.264/MPEG4-AVC compliant picture parameter sets.

13. The apparatus according to claim 11, wherein said first picture parameter information set and said second picture parameter information set comprise H.264/MPEG4-AVC compliant sequence parameter sets.

14. The apparatus according to claim 11, further comprising a third circuit configured to store said first picture parameter information set and said second picture parameter information set.

15. The apparatus according to claim 14, wherein said third circuit is further configured to store a plurality of H.264/MPEG4-AVC compliant sequence parameter sets and a plurality of H.264/MPEG4-AVC compliant picture parameter sets.

16. The apparatus according to claim 11, wherein:
said second circuit is configured to tag only one sequence parameter set and one picture parameter set as active at any given time.

17. The apparatus according to claim 11, wherein said first circuit comprises:
a first parser configured to parse a network abstraction layer (NAL) unit syntax from said bitstream; and
a second parser configured to parse one or more NAL unit types from said NAL unit syntax.

18. The apparatus according to claim 17, wherein:
said second parser is further configured to parse said one or more NAL unit types based upon an active sequence parameter set and an active picture parameter set.

19. The apparatus according to claim 17, further comprising:
a video decoder configured to decode said bitstream based upon an output from said second parser, an active sequence parameter set and an active picture parameter set.

20. The apparatus according to claim 19, further comprising:
a device configured to present a video display in response to an output of said video decoder and an output of said second parser.

* * * * *